W. S. IRELAND AND W. H. MEYER.
MECHANISM FOR LOCKING WASHING MACHINE TUBS.
APPLICATION FILED OCT. 27, 1919.
1,403,904.
Patented Jan. 17, 1922.
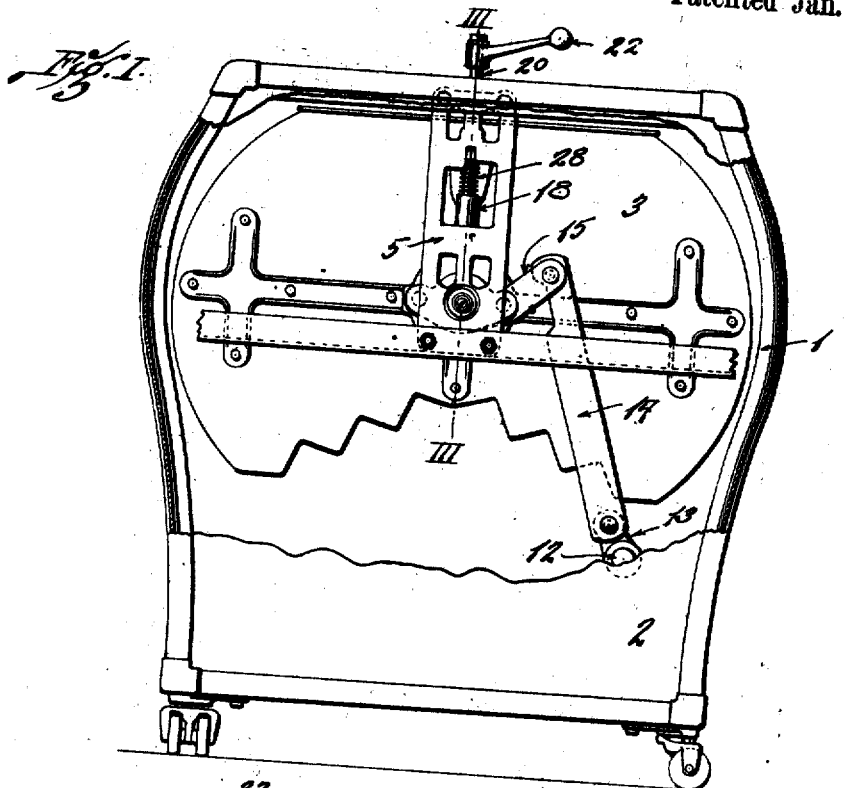
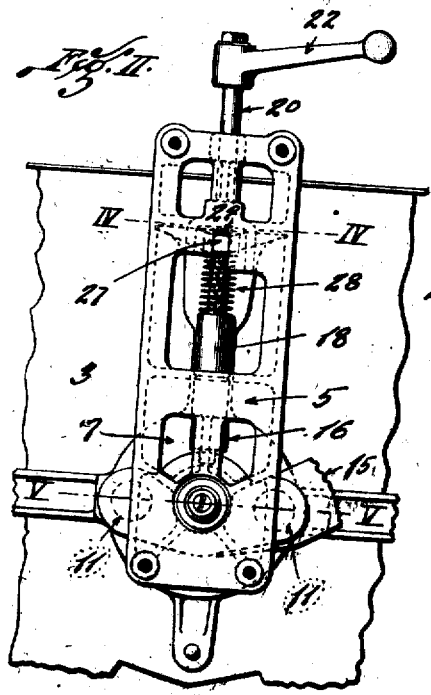
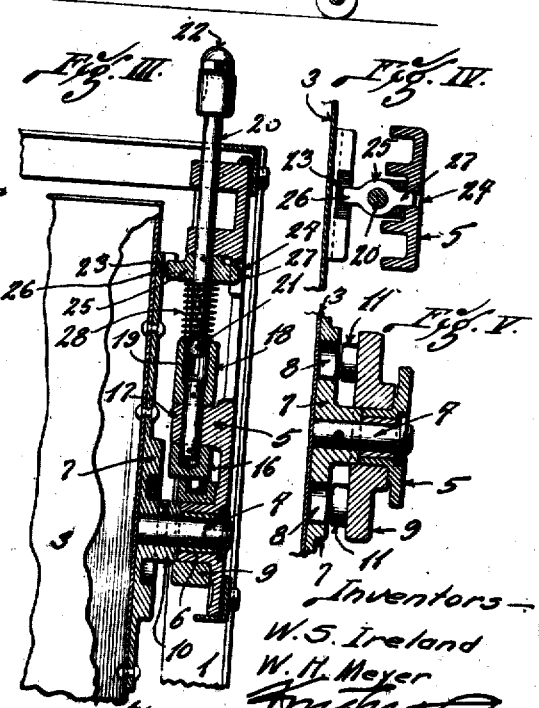
Inventors—
W. S. Ireland
W. H. Meyer

UNITED STATES PATENT OFFICE.

WARD S. IRELAND AND WILLIAM H. MEYER, OF ST. LOUIS, MISSOURI, ASSIGNOR, BY MESNE ASSIGNMENTS, TO THE DAVIS SEWING MACHINE COMPANY, A CORPORATION OF DELAWARE.

MECHANISM FOR LOCKING WASHING-MACHINE TUBS.

1,403,904.　　　　　Specification of Letters Patent.　　Patented Jan. 17, 1922.

Application filed October 27, 1919. Serial No. 333,715.

*To all whom it may concern:*

Be it known that we, WARD S. IRELAND and WILLIAM H. MEYER, citizens of the United States of America, residents of the city of St. Louis, in the State of Missouri, have invented certain new and useful Improvements in Mechanism for Locking Washing-Machine Tubs, of which the following is a full, clear, and exact description, reference being had to the accompanying drawings, forming a part of this specification.

Our invention relates to a mechanism for locking the tubs of washing machines and is intended more particularly for use in holding oscillating tubs to prevent tilting thereof when the tub is not in motion. The device to which our present invention relates is one whereby the washing machine tub may be connected to the main frame of the washing machine to hold the tub in a fixed position, and the locking means is used in conjunction with clutch operating mechanism provided for the connection of the tub to power mechanism by which the tub is operated.

Fig. I is a side elevation of a washing machine having our improvement incorporated therein, the casing of the machine being partly broken away.

Fig. II is an enlarged side elevation of the tub locking device and parts directly associated therewith.

Fig. III is an enlarged vertical section taken on line III—III, Fig. I.

Fig. IV is a cross section taken on line IV—IV, Fig. II.

Fig. V is a cross section taken on line V—V, Fig. II.

In the drawings, 1 designates the main frame of a washing machine, preferably enclosed within a suitable casing 2. The washing machine tub 3, adapted to oscillate within the machine, is supported by suitable pivots, one of which (not shown) is located in a suitable bearing at one side of the tub and the other of which, designated by the numeral 4, is mounted in a subframe 5 secured to the main frame 1. Said subframe includes a bearing 6, extending inwardly toward the tub, in which the pivot 4 is mounted.

7 designates a clutch member secured to the tub 3 adjacent the pivot 4 and having formed therein recesses 8 (see Fig. V). A slidable clutch member 9, movable to and fro on the bearing 6, and on a guide 10 opposite said bearing conjoined to the clutch member 7, is provided with bosses 11, which are adapted to enter the recesses 8 in the clutch member 7 to connect said slidable clutch member to the tub 3.

A drive shaft 12, adapted to be operated in any suitable manner, is provided with a crank 13 to which a connecting rod 14 is pivoted. Said connecting rod is connected to the slidable clutch member 9 by a connecting arm 15 fixed to the clutch member 9 and receiving the pivotal attachment of said connecting rod. It will be understood that, when the power shaft 12 is rotated, reciprocating movement will be imparted to the connecting rod 14, and in consequence of this movement the clutch member 9 will be oscillated on the support provided therefor. It will be further understood that, if said clutch member 9 is retracted from engagement with the clutch member 7 on the tub, said clutch member will merely be oscillated on the bearing 6 when the connecting rod 14 is in motion, whereas, if the clutch member is moved toward the tub, the bosses 11 carried thereby will enter the recesses 8 in the clutch member 7 and oscillation will therefore be imparted to said tub in response to movement of said connecting rod.

Proceeding now to description of the means for shifting the slidable clutch member 9: 16 is a rockable shifter crank engaging the clutch member 9 and carried by a short shaft 17, loosely arranged in the subframe 5 and to which is conjoined a sleeve 18 provided with one or more longitudinal slots 19. A shaft 20, provided with a handle 22, is rotatable in the subframe 5 and is provided with a transverse pin 21 movable longitudinally in the slot or slots in the sleeve 18, thereby providing slot and pin engagement between said shaft 20 and said sleeve 18, so that when said shaft 20 is rotated it will impart movement to the shaft 17 and the cam 16 to shift the clutch member 9 into or out of engagement with the clutch member 7. The slot and pin connection between the shaft 20 and the sleeve 18 is unessential in so far as the operation of the clutch member 9 is concerned, but is provided as an incident to the tub locking means about to be described.

Upon the tub 3 at its side adjoining the subframe 5 is a socket or keeper 23, and in said subframe is a socket or keeper 24, these parts 23 and 24 being adapted to register opposite each other when the washing machine tub is stationary and the clutch member 9 is out of of engagement with the clutch member 7. A locking head 25, secured to the shaft 20, is provided with fingers 26 and 27 which are adapted to be engaged with the keepers 23 and 24, respectively, and when said fingers are engaged with said keepers the tub is securely locked to the subframe to hold it from swinging on its pivots, as it would in the absence of any means for holding it when the clutch member 9 is disengaged from the tub carried clutch member 7. A coil spring 28, surrounding the shaft 20 and interposed between the sleeve 18 and the locking head 25, serves to sustain the fingers of the locking head in engagement with the keepers 23 and 24, but when the tub is to be disengaged from the holding influence of said locking head, said spring yields to downward pressure upon the shaft 20 and said shaft, by sliding relative to the sleeve 18, is moved endwise to a sufficient degree to provide for the removal of the locking head from the keepers 23 and 24. Then, by rotating the shaft 20, a like rotation is imparted to the cam 16 and the clutch member 9 is moved into engagement with the clutch member 7 to provide for the operation of the washing machine tub by the tub operating mechanism.

We claim:

1. A washing machine comprising a support, a tub pivoted to said support, tub operating means including a clutch, a crank for shifting said clutch into and out of operative position, an operating shaft loosely connected to said crank and movable longitudinally relative thereto, and a tub locking member carried by said shaft movable into and out of engagement with said tub.

2. A washing machine comprising an oscillatory tub, power mechanism, a clutch through which motion is transmitted from said power mechanism to said tub, said clutch being shiftable to control the transmission of movement to said oscillatory tub, locking means adapted to retain the tub in a fixed position when said clutch is positioned to release said power mechanism from the tub, and an operating shaft common to said clutch and locking means, said shaft being movable longitudinally to actuate said locking means and movable about its axis to shift said clutch.

3. A washing machine comprising a support, an oscillatory tub supported thereby, power mechanism, a clutch including an oscillating clutch member through which motion is transmitted from said power mechanism to said tub, said clutch being shiftable to control the transmission of movement to said oscillatory tub, locking means cooperable with said tub and support to retain the tub in a fixed position when said clutch is positioned to release said power mechanism from the tub, and an operating shaft common to said clutch and locking means, said shaft being movable longitudinally to actuate said locking means and movable about its axis to shift said clutch.

4. A washing machine comprising an oscillatory tub, power mechanism, a clutch through which motion is transmitted from said power mechanism to said tub, a clutch shifter movable to control the transmission of movement to said oscillatory tub, locking means adapted to retain the tub in a fixed position when said clutch is positioned to release said power mechanism from the tub, said locking means comprising a keeper carried by the oscillatory tub and a locking element cooperable with said keeper to lock the tub, and an operating shaft secured to said clutch shifter and locking element, said operating shaft being movable in one direction to actuate said locking means and in another direction to actuate said clutch shifter.

5. A washing machine comprising an oscillatory tub, power mechanism, a clutch through which motion is transmitted from said power mechanism to said tub, a clutch shifter movable to control the transmission of movement to said oscillatory tub, locking means adapted to retain the tub in a fixed position when said clutch is positioned to release said power mechanism from the tub, said locking means comprising a keeper carried by the oscillatory tub and a locking element cooperable with said keeper to lock the tub, and an operating shaft comprising two shaft sections one of which is movable longitudinally relative to the other, the longitudinally movable shaft section being secured to said locking element and the other shaft section being secured to said clutch shifter.

6. A washing machine comprising an oscillatory tub, power mechanism, a clutch through which motion is transmitted from said power mechanism to said tub, a clutch shifter movable to control the transmission of movement to said oscillatory tub, locking means adapted to retain the tub in a fixed position when said clutch is positioned to release said power mechanism from the tub, said locking means comprising a keeper carried by the oscillatory tub and a locking element cooperable with said keeper to lock the tub, and an operating shaft comprising two shaft sections one of which is movable longitudinally relative to the other, the longitudinally movable shaft section being secured to said locking element and the other shaft section being secured to said clutch shifter and a spring cooperating with the longitudinally movable shaft section to yieldingly retain said locking element in its operative position.

7. A washing machine comprising an oscillatory tub, power mechanism, a clutch through which motion is transmitted from said power mechanism to said tub, a clutch shifter movable to control the transmission of movement to said oscillatory tub, locking means adapted to retain the tub in a fixed position when said clutch is positioned to release said power mechanism from the tub, said locking means comprising a keeper carried by the oscillatory tub and a locking element cooperable with said keeper to lock the tub, and an operating shaft comprising a shaft section rigidly secured to said locking element, a shaft section rigidly secured to said clutch shifter and a slidable connection uniting said shaft sections and permitting the first mentioned shaft section to move longitudinally relative to the other shaft section, the first mentioned shaft section being movable longitudinally to shift said locking element to and from its operative position, and both shaft sections being movable about their axis to actuate said clutch shifter.

In testimony that we claim the foregoing we hereunto affix our signatures.

WARD S. IRELAND.
WILLIAM H. MEYER.